Patented Oct. 13, 1931

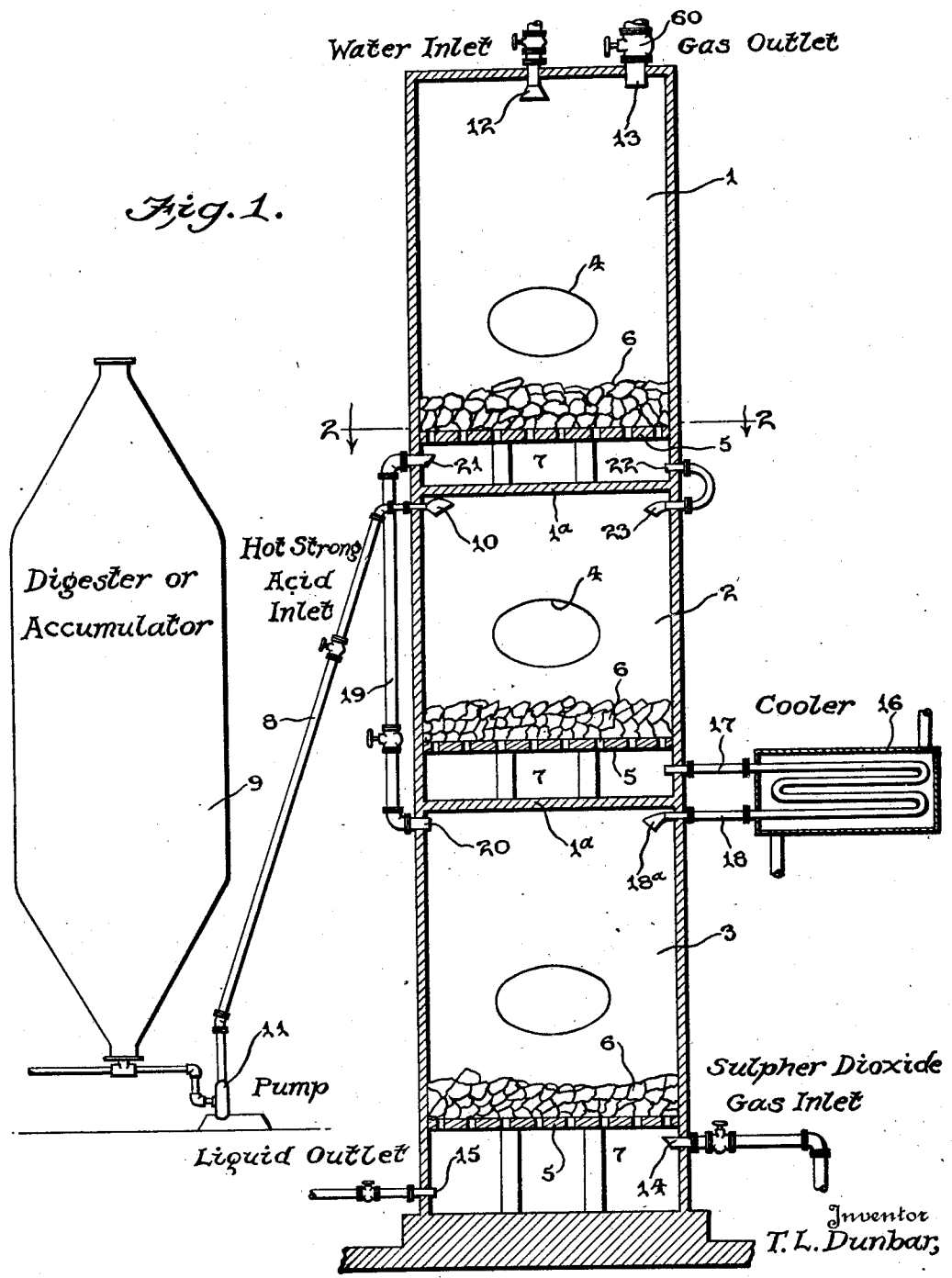

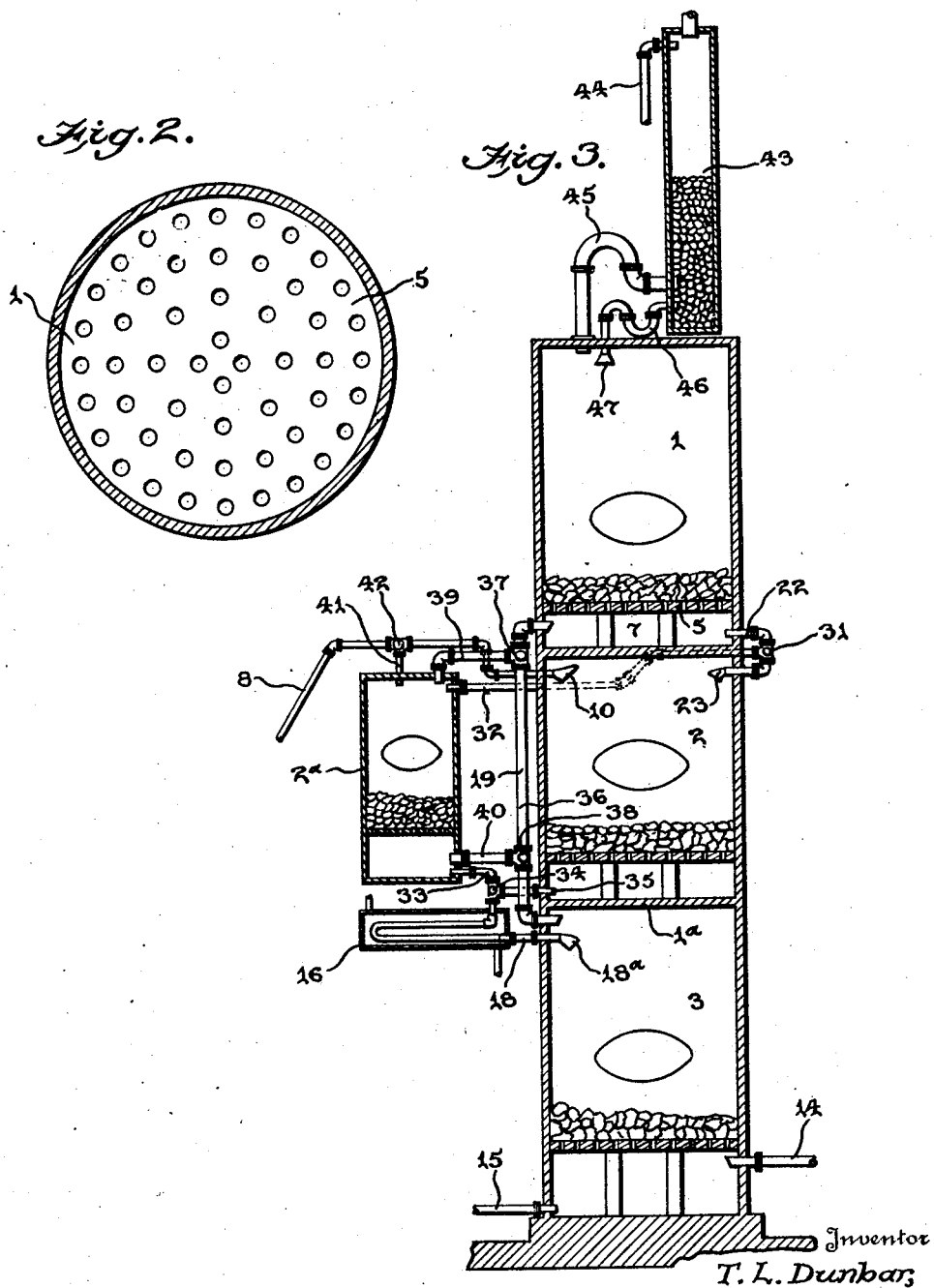

1,826,753

UNITED STATES PATENT OFFICE

THOMAS LEONIDAS DUNBAR, OF WATERTOWN, NEW YORK, ASSIGNOR TO CHEMIPULP PROCESS, INCORPORATED, A CORPORATION OF NEW YORK

METHOD AND APPARATUS FOR MAKING CHEMICAL SOLUTIONS

Application filed February 5, 1929. Serial No. 337,599.

This invention pertains to improvements in the making of chemical solutions, and to new and useful apparatus therefor. In a specific illustrative embodiment, this invention provides improvements in the manner of preparing acid or bisulphite liquor; for example, suitable for the digestion of wood pulp. Also, this invention provides improvements in towers for the preparation of such solutions.

Heretofore, it has been customary in the absorption of gases, to produce acid solutions, to provide relatively large absorption towers, about ninety feet in height, and of substantial diameter, and to introduce the gases and liquids into such towers in cold condition, and to effect the reactions at about atmospheric pressure. Due to such conditions, it requires relatively large masses of lime or the like, to provide the requisite contact area, and furthermore, as the substances are not heated, a relatively great time is required to effect the dissolving of the lime or the like.

I have discovered that if the lime or the like is heated, that the dissolving thereof is accelerated, and consequently, a much smaller and less expensive apparatus may be employed in such acid systems. Furthermore, I have discovered that the heating of the lime rock, dolomite, or any other suitable reacting compound may be effected by heat units contained either in the liquid introduced into the absorption tower, or in the gas admitted to such towers. For example, if an acid system containing my improvements is employed in conjunction with digesters used for the digestion of fibrous material, such as wood chips, hot, strong or weak acid from the digesters or the digesting system may be introduced into the absorption tower for the purpose of rapidly dissolving the lime rock, dolomite or the like.

In the preparation of the sulphur dioxide gas, it is common practice to produce such gas in a sulphur burner, and to then pass the same through coolers before introducing the gas into the absorption tower. I have also found that if such gas is not passed through coolers, but is led directly in its heated condition into the absorption tower, that the heat units contained in the gas may be imparted to the lime rock or the like in the tower, so that such reaction material may be expeditiously dissolved when the liquid contacts therewith.

It will therefore be understood that one of the objects of the invention is to provide an acid preparation system in which the lime stone, dolomite or the like, is heated in any suitable way, but preferably by the liquid or gas, or both liquid and gas introduced into the tower.

I have also discovered that absorption, in systems of this character, is facilitated if the tower is maintained under super-atmospheric pressure, and another object of the invention is to furnish an acid system in which absorption may take place under such super-atmospheric pressure.

In the absorption of gases to produce acid solutions, it is highly desirable to increase the facility with which temperatures may be controlled. It is another object of this invention to afford such control, and particularly at intermediate stages of the absorption process, to obtain regulable cooling of the liquid during its progress to a later stage of the absorption.

A further object is to provide such intermediate cooling of the absorption liquor during its transit between stages, that the concentration of the gas being dissolved may be controlled from stage to stage. Yet another object is to station relief towers at intermediate points in the main tower system, and in a specific embodiment, to station such relief towers at regions to which the absorption gases may be diverted after such gases have been contacted with liquid which has passed through the intermediate temperature regulators aforementioned.

A further object is to provide such relief towers as may be regulably interchangeable in effect with any one of a plurality of absorption zones of the tower.

An additional object is to provide means for efficient extraction of the gases at the latter stages of their passage, particularly just before they are vented from the tower system; and also simultaneously by the same means to condition the liquid that is being introduced into the tower system proper.

Other objects will be apparent with further understanding of this invention, and with its practice, as now set forth more in detail.

This invention may be illustrated by reference to the process of absorbing sulphur dioxide in water in the presence of an alkaline substance. For instance, lime or dolomite usually are employed in the production of bisulphite liquor, and water and sulphur dioxide gas usually are led countercurrently to each other over the lime contained in towers. In the practice of this invention, there is provided a series of such towers, with the improvements to be described placed between two or more of the stages of the series.

Referring to the drawings,

Fig. 1 is a vertical sectional view partly in elevation, of one form of my improved apparatus.

Fig. 2 is a horizontal sectional view taken on line 2—2 of Fig. 1.

Fig. 3 is a vertical sectional view of a modificaton.

In the embodiment of the invention illustrated in Figs. 1 and 2, an absorption tower is shown provided with superposed units or compartments 1, 2 and 3. Of course, a greater or less number of compartments may be used in actual practice. These compartments are isolated from one another by imperforate partitions 1a.

Each compartment has a door-closed opening 4 for the insertion or removal of lime rock, dolomite, or any reacting compound or inert filler, to be used in the manufacture of the acid.

A grid or percolation plate 5 is arranged in each chamber to support the filler 6 through which the liquid percolates into a sump 7 which is positioned beneath each grid for the accumulation of sludge, etc.

One or more of the chambers is connected with a supply of hot strong acid or hot gas. As illustrated in Fig. 1 this fluid flows through a valved pipe 8 from a digester or accumulator, for example, and it is discharged into the upper portion of the chamber 2 by means of a rose or nozzle 10 which sprays the same uniformly on to the filling 6 of that chamber. Where necessary, a pump 11 may be arranged in the pipe line 8 for forcing the hot strong acid from the chamber 9 to the tower.

Preferably, the system is of the countercurrent type, and water or weak acid liquor is introduced into the upper chamber 1 through a valved pipe which terminates in a rose or nozzle 12 that sprays the liquid evenly on to the filler 6 of that chamber. A gas outlet 13 is also provided for this chamber.

The lower chamber 3 is furnished with a valved pipe 14 for introducing $SO_2$ into that chamber, and this chamber also has a valved pipe 15 serving as a liquor outlet.

16 designates temperature control means or a cooler located between the units 2 and 3, and liquid from the unit 2 is fed to 16 by way of pipe 17. The cooled liquid is discharged from 16 through a pipe 18 that terminates in a nozzle 18a which sprays the liquid on to the filler 6 in the unit 3. The temperature control or cooler 16 has been illustrated as conventional coil and tank means.

A valved pipe 19 functions to lead gas from an outlet 20 in unit 3, to an inlet 21 which is located in the sump of the unit 1.

In order to pass liquid from the last mentioned sump to the upper portion of the unit 2, a pipe 22 is provided, and this pipe terminates in a nozzle 23 that sprays the liquid evenly over the filler in the unit 2.

As heretofore stated, in acid preparation systems heretofore generally used, extremely large absorption towers were deemed essential, due to the fact that the cold gas entering the system required a relatively large area of contact with the lime stone or the like, in order to obtain the required solvent action. In contradistinction to this, in my system, the acid in heated condition from the digestion plant, for example, entering the system through the pipe 8, immediately exerts a dissolving action on the lime stone or the like in the compartment 2, whereby the dissolving of the reaction material is accelerated.

The gas entering the system through the pipe 14 may be either cold or heated, and if it is in heated condition, it will impart heat units to the lime stone or the like, in the compartment 3, so that this lime stone, upon contact with the liquor entering through pipe 18, will be rapidly dissolved. The gas entering through the pipe 14 may come directly from a sulphur burner without cooling the gas in transit.

While I have disclosed the heating of the reacting material by heat units contained in the liquid or gas introduced into the system, it will be manifest that such material may be heated in any other way, for instance, by embedding heating coils in such material within the tower.

A pressure valve 60 is preferably provided on the gas outlet pipe 13, in order that the system may be maintained under any suitable super-atmospheric pressure, if desired. Of course, if the system is operated under super-atmospheric pressure, the absorption action will be facilitated.

The system shown in Fig. 3 is similar in general respects to the system shown in Fig. 1, 1, but additional features are incorporated in Fig. 3. For example, each unit may be provided with an auxiliary chamber, as shown at 2a, in order that the auxiliary chamber may be hooked into the system, while its corresponding main chamber is being refilled with the filling material 6. As shown in Fig. 3, the liquid conduit 22 is provided with a suitable valve 31, so that the liquid may be fed either to the nozzle 23 or through a pipe 32, into the upper portion of the auxiliary unit 2a. The temperature control or cooler 16 in this form of the invention, may have its inlet pipe 33 branched and provided with a valve 34, so that liquid may be fed from the unit 2 to the cooler, through the inlet 35, or through the inlet 36 from the auxiliary chamber 2a.

In this modification, the pipe 19 will be provided with suitable valves 37 and 38, and with branch pipes 39 and 40 that lead to the upper and lower portion of the chamber 2a. Obviously, when the valves 37, 38 are properly set, gas can flow from the unit 3 to unit 1 directly, or indirectly by being by-passed through the chamber 2a.

To suit this modification, the hot strong acid inlet pipe 8 is branched at 41 and provided with a suitable valve 42 to permit the hot strong acid to be fed directly into the upper portion of either the chamber 2 or 2a.

From the above it may be readily seen that unit 2 can be kept in operation while auxiliary unit 2a is being charged with fresh lime stone or other suitable substance, and likewise, unit 2a may be used as auxiliary means, while chamber 2 is being refilled. It is manifest that in a similar manner, gases or liquids may be by-passed around any chamber while the refilling process is taking place.

As another additional feature of the embodiment shown in Fig. 3, I provide at the top of the tower, a supplementary absorption chamber 43, which may be filled with inert blocks or the like. Fresh water may enter this chamber through a pipe 44, and in the chamber it will meet the practically exhausted gases from unit 1, which rise through a pipe 45. The water completes the absorption of any traces of sulphur dioxide gas which may escape from chamber 1, and carries it back to this chamber in solution, through a pipe 46 which terminates in a rose 47 that sprays the liquid on to the filler of the unit 1.

Instead of introducing fresh water into the pipe 44, I may introduce through this conduit a weak partially prepared acid or relief liquor from sulphite digesters.

All chambers and conduits of the system should be lined with a suitable acid-proof lining.

It is apparent from the foregoing that the number of units may be varied from that illustrated, that their positioning likewise may be varied, they may be horizontally spaced, as well as vertically spaced, and that suitable openings or other conveying means may be provided as desired for liquid or gas.

In the operation of such an organization, it may be taken as illustrated, that hot strong acid from a digester 9 is forced by a pump 11 through the line 8, and into the unit 2, and is sprayed on to the filler 6 of that unit.

Sulphur dioxide gas, suitably prepared and cooled (or heated), enters the lower part of unit 3 through 14 and passes upwardly in contact with the lime stone filling 6 for example, meeting cool acid liquor passing through nozzle 18a from the cooler 16. The cooled and partially exhausted gas from unit 3 is conveyed by the pipe 19 into the lower portion of the unit 1. Water or dilute sulphurous acid, enters chamber 1, through the nozzle 12, and meets this partially exhausted gas in the presence of lime stone, etc., to form a weak solution. This latter leaves unit 1 through the pipe 22, and enters the unit 2 through nozzle 23. In the chamber 2, this liquid intermingles with products of the hot strong acid from nozzle 10, and the combined liquid passes into the cooler 16 for regulable adjustment of its temperature. From the cooler, it meets and cools the gas in 3, as previously described.

Obviously, if the system of Fig. 3 is used instead of that in Fig. 1, the actions mentioned in connection with chamber 2 may take place in the chamber 2a, when the valves are properly set to by-pass through 2a and around 2. In this arrangement, it is of course, feasible to conduct the gas from unit 3, directly to unit 1, while the liquid from unit 1 may, at the same time, be diverted through chamber 2a. Or both the gas and liquid paths may be through unit 2a. Such flexibility permits adjustment of liquid and gas concentration; it also permits utilizing a relief unit, while a main unit is being charged with filler or being repaired. A further illustration of the flexibility of this system is in utilizing both units 2 and 2a, with the desired liquid.

I have referred above to systems in which the reacting material 6, the acid entering through 8, and gas entering through 14 may be heated, and as a further modification, I contemplate, when conditions are such that hot acid cannot be drawn from the accumulator or accumulators 9, to heat such acid by other means. For example, I propose to make additional provision for heating the sulphite liquor by introducing hot $SO_2$ gases from a sulphur burner into a finished or partially finished cooled liquor. Such liquor may be located in a tank connected by a valved pipe to the conduit 8, and the $SO_2$ gas from a sulphur burner (in heated condition) may be inserted into this liquor. This will be of particular advantage where the sulphite plants are periodically shut down. For instance, in practically every case, the sulphite plants are shut down on Sunday morning, and the cooking operations are suspended until Sunday midnight, or Monday morning. In the event that cooking operations are suspended, as is usually the case, then there is no source from which to draw heat for the purpose of heating up the necessary liquor with which to contact the filling in the acid making towers. However, the sulphur burners are usually started some three or four hours prior to the beginning of cooking, and in my present invention, I take advantage of this and lead a percentage of the hot $SO_2$ gases from the burners into a tank containing cool prepared sulphite liquor. After such liquor has been heated by the gases, it is introduced into the tower for treating the filling 6.

Referring again to Fig. 3, it may be stated that the supplementary unit 43 not only completes the removal of sulphur dioxide from the gas, but provides a liquid relatively high in sulphur dioxide, but relatively low in base, to serve in the last gas reaction chamber 1, for better reaction there.

It will be obvious that in operating either the system shown in Fig. 1, or the system shown in Fig. 3, under super-atmospheric pressure, that suitable pressure valves must be arranged on the outlet pipes, and that the materials introduced must be forced into the tower under sufficient pressure to overcome the pressure maintained in the tower.

While specific embodiments of this invention have been presented for illustration, and as forms now considered preferable, no limitation is implied thereby, but only such restrictions as are imposed by the prior art under the terms of the claims herewith.

What is claimed and desired to be secured by Letters Patent is:

1. In the process of absorbing sulphur dioxide in aqueous solutions, the steps which comprise reacting hot sulphurous acid solution with solid lime containing material, cooling the resulting solution and passing sulphur dioxide gas therein in the presence of solid lime containing material.

2. The process as in claim 1 wherein the sulphur dioxide gas is hot.

3. In a process of absorbing sulphur dioxide in aqueous solutions, the step which comprises passing sulphur dioxide gas into an aqueous solution thereof in the presence of solid lime containing material maintained in heated condition.

4. In the process of absorbing sulphur dioxide in aqueous solutions, the steps which comprise mixing hot strong sulphurous acid solution with a cooler dilute sulphurous acid solution in the presence of solid lime containing material, cooling the resulting solution, and passing sulphur dioxide gas therein in the presence of solid lime containing material.

5. The process as in claim 4 wherein the sulphur dioxide gas is hot.

6. In the process of preparing a bisulphite liquor, the step which comprises mixing hot concentrated sulphurous acid solution with a cooler dilute solution of sulphurous acid in the presence of solid lime containing material and maintaining said material in contact with the mixed solution for a time sufficient for the material to react therewith.

7. The process of absorbing sulphur dioxide gas in aqueous solutions to obtain a sulphite liquor, which comprises, mixing hot strong sulphurous acid solution with cooler dilute sulphurous acid solution in the presence of solid lime containing material, cooling the resulting solution, absorbing sulphur dioxide gas therein, in the presence of solid lime containing material, and passing unabsorbed sulphur dioxide gas from the last mentioned absorption into contact with water in the presence of solid lime containing material to prepare a dilute sulphurous acid solution to be mixed with further quantities of hot strong sulphurous acid.

8. The process as in claim 7 in which the sulphur dioxide gas entering the first mentioned absorption stage is hot.

9. An apparatus for absorbing sulphur dioxide in aqueous solution comprising a tower divided into a plurality of separated absorption units, perforated plates in each of said units said plates being spaced from the bottom of each unit, means to pass sulphur dioxide gas into the lowermost of said units beneath the perforated plate therein, a by-pass pipe to by-pass gas from the upper portion of the lowermost unit around the next adjacent unit and into a unit above the last mentioned unit, means to pass liquid through the units in series and cooling means to cool liquids entering the lowermost unit from the unit next adjacent thereto.

10. In a process of absorbing sulphur dioxide in aqueous solutions, the step which comprises passing hot sulphur dioxide gas into an aqueous solution thereof in the presence of solid lime containing material.

THOMAS LEONIDAS DUNBAR.